United States Patent
Olson

(12) United States Patent (10) Patent No.: US 11,242,010 B2
Olson (45) Date of Patent: Feb. 8, 2022

(54) PIVOTING STEP WITH ROLLER

(71) Applicant: POWER PIN INC., Fort Qu'Appelle (CA)

(72) Inventor: Brian R. Olson, Fort Qu'Appelle (CA)

(73) Assignee: POWER PIN INC., Fort Qu'Appelle (CA)

( * ) Notice: Subject to any disclaimer, the term of this patent is extended or adjusted under 35 U.S.C. 154(b) by 162 days.

(21) Appl. No.: 16/801,417

(22) Filed: Feb. 26, 2020

(65) Prior Publication Data

US 2020/0307460 A1 Oct. 1, 2020

(30) Foreign Application Priority Data

Mar. 29, 2019 (CA) .................................. CA 3038458

(51) Int. Cl.
 *B60R 3/02* (2006.01)
(52) U.S. Cl.
 CPC ...................................... *B60R 3/02* (2013.01)
(58) Field of Classification Search
 CPC .......................................................... B60R 3/02
 See application file for complete search history.

(56) References Cited

U.S. PATENT DOCUMENTS

| | | | | |
|---|---|---|---|---|
| 2,653,036 | A * | 9/1953 | Jamese | B60R 3/02 182/91 |
| 2,678,832 | A * | 5/1954 | Wright | B60R 3/02 182/89 |
| 5,007,654 | A * | 4/1991 | Sauber | B60R 3/02 182/89 |
| 6,321,873 | B1 | 11/2001 | LaBrash | |
| 7,025,174 | B1 | 4/2006 | Hawley | |
| 8,720,924 | B2 * | 5/2014 | Ruehl | B60R 3/00 280/164.1 |
| 9,156,405 | B1 | 10/2015 | Levesque | |
| 9,725,041 | B2 * | 8/2017 | Rinaldi | B60R 3/02 |
| 2002/0003340 | A1 | 1/2002 | Hallquist | |
| 2002/0189903 | A1 | 12/2002 | Krish | |

FOREIGN PATENT DOCUMENTS

CA 2940951 A1 3/2018

* cited by examiner

*Primary Examiner* — Bryan A Evans
(74) *Attorney, Agent, or Firm* — Dickinson Wright PLLC; Andrew D. Dorisio

(57) ABSTRACT

A step apparatus for a vehicle with a rear impact guard beam includes top and bottom steps mounted on a step frame adapted to be pivotally attached to the rear impact guard beam about a step pivot axis oriented horizontally and perpendicular to an operating travel direction of the vehicle. The step frame is movable from an operating position to a stored position. A roller is mounted to a bottom rear end of the step frame about a roller rotational axis oriented parallel to the step pivot axis, and located above the step pivot axis. An upright surface moving toward the step frame contacts the roller component and the roller rolls upward along the upright surface and pivots the step frame about the step pivot axis from the operating position to the stored position.

9 Claims, 2 Drawing Sheets

PIVOTING STEP WITH ROLLER

This disclosure relates to the field of transport vehicles and in particular a folding step apparatus for a person to facilitate access to elevated van bodies.

BACKGROUND

Van bodies mounted on trailers or truck frames have a floor that is typically about 48 inches above the ground. A rear impact guard beam is generally required by transportation authorities, and is mounted at the rear of the van body about 24 inches off the ground as a safety measure to prevent the front end of a car from passing under the trailer floor if same were to crash into the van from the rear.

The high floor makes it difficult for a person to access the van body as the rear impact guard beam is quite high to step onto. Various access aids are disclosed in the prior art, for example as described in U.S. Pat. No. 8,720,924 to Ruehl, U.S. Pat. No. 9,156,405 to Levesque, U.S. Pat. No. 7,025,174 to Hawley, and U.S. Pat. No. 6,321,873 to Labrash, as well as in United States Published Patent Application Numbers 2002/0189903 of Krish, Jr. and 2002/0003340 of Hallquist.

Canadian Patent Application Number 2,940,951 of the present inventor Olson discloses a van body access aid comprising a step frame pivotally attached to the rear impact guard beam under the rear door movable from an operating position where stepping surfaces of the steps are oriented substantially horizontally, to a stored position where stepping surfaces of the steps are oriented substantially vertically.

SUMMARY OF THE INVENTION

The present disclosure provides a step apparatus for elevated vehicle load beds that overcomes problems in the prior art.

The present disclosure provides a step apparatus for an elevated load bed mounted on a vehicle, the vehicle comprising a rear impact guard beam mounted under a rear end of the load bed. The apparatus comprises top and bottom steps mounted on a step frame, and the step frame is adapted to be pivotally attached to the rear impact guard beam about a step pivot axis oriented substantially horizontally and perpendicular to an operating travel direction of the vehicle. The step frame is configured such that when pivotally attached to the rear impact guard beam, the step frame is movable from an operating position, where stepping surfaces of the steps are oriented substantially horizontally, to a stored position where the stepping surfaces of the steps are above and forward of a rear face of the rear impact guard beam. A roller component is rotatably mounted to a bottom rear end of the step frame about a roller rotational axis oriented substantially parallel to the step pivot axis, and located above the step pivot axis. An outer surface of the roller component located rearward of the steps and step frame when the step frame is in the operating position. The roller component is configured such that, when the step frame is in the operating position, an upright surface moving toward the step frame contacts the roller component and exerts a forward contact force on the roller component such that the roller component rolls upward along the upright surface and pivots the step frame about the step pivot axis from the operating position to the stored position.

The disclosed step apparatus reduces the risk of damage if an operator forgets to move the step apparatus from the operating position to the stored position after use. If the vehicle reverses into an upright surface like a loading dock, the step apparatus will pivot upward about the step pivot axis, which is lower than the point of contact with the roller component to the stored position while the roller component rolls up the upright surface.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
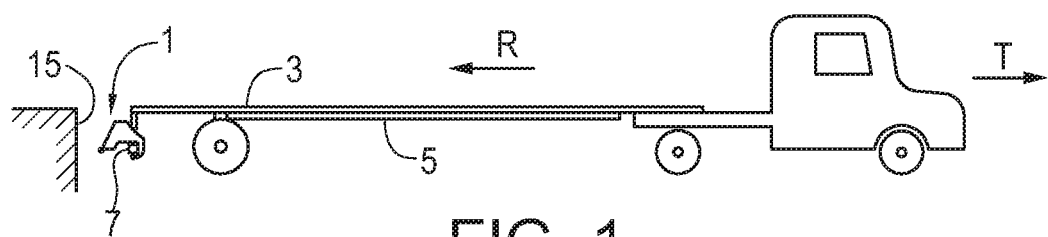
FIG. 1 is a schematic side view of an embodiment of the step apparatus of the present disclosure mounted to a vehicle.

FIGS. 1-4 schematically illustrate an embodiment of a step apparatus 1 of the present disclosure for an elevated load bed 3 mounted on a vehicle 5. The vehicle 5 comprises a rear impact guard beam 7 mounted under a rear end of the load bed 3. The apparatus comprises top and bottom steps 9A, 9B mounted on a step frame 11. The step frame 11 is adapted to be pivotally attached to the rear impact guard beam 7 about a step pivot axis SPA oriented substantially horizontally and perpendicular to an operating travel direction T of the vehicle 5.

Figure 2:
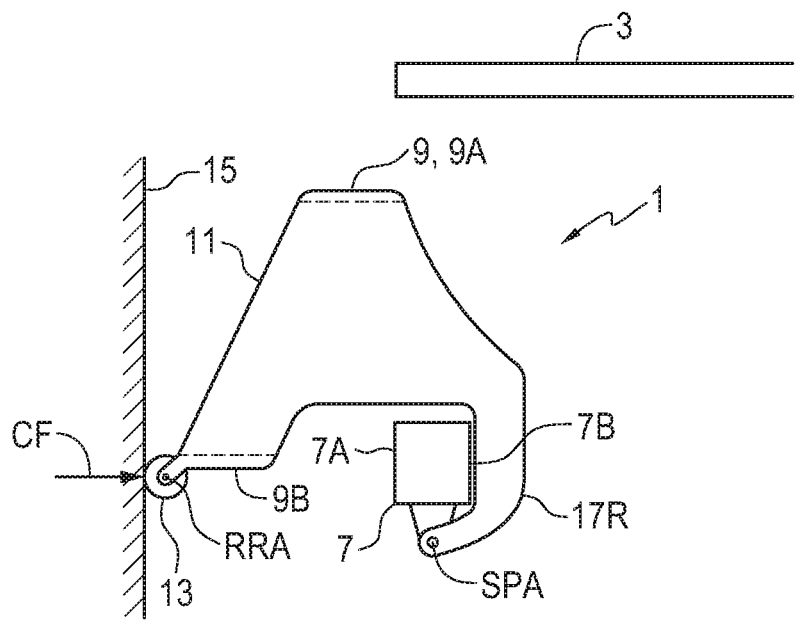
FIG. 2 is a schematic side view of the embodiment of FIG. 1 in the operating position with the roller component just coming into contact with an upright surface as the vehicle moves in reverse.
Figure 3:
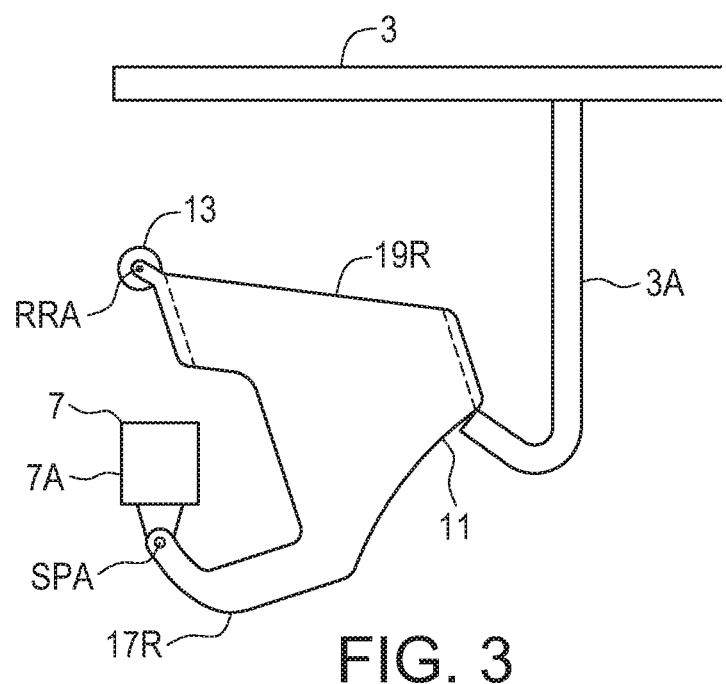
FIG. 3 is a schematic side view of the embodiment of FIG. 1 in the stored position.
Figure 4:
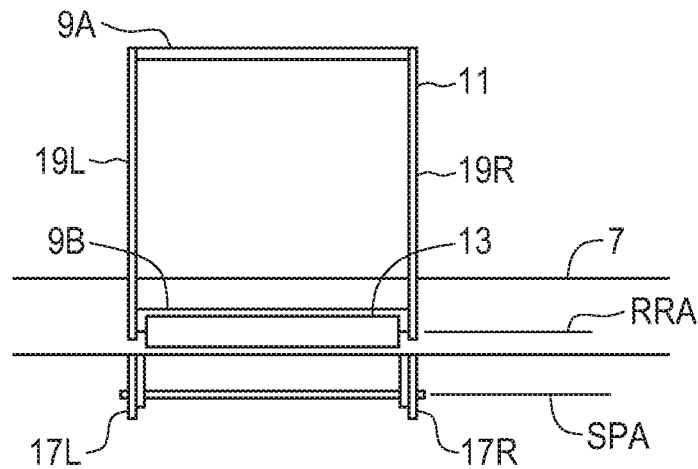
FIG. 4 is a schematic rear view of the embodiment of FIG. 1 in the operating position.

The step frame 11 is configured such that when pivotally attached to the rear impact guard beam 7, the step frame 11 is movable from an operating position, shown in FIG. 2 where stepping surfaces of the steps 9 are oriented substantially horizontally, to a stored position shown in FIG. 3 where the stepping surfaces of the steps 9 are above and forward of a rear face 7A of the rear impact guard beam 7, and resting on a frame stop 3A extending down from the load bed 3 where the apparatus 1 may be secured if desired.

A roller component, here provided by a cylindrical roller 13, is rotatably mounted to a bottom rear end of the step frame 11 about a roller rotational axis RRA oriented substantially parallel to the step pivot axis SPA, and located above the step pivot axis SPA. The outer surface of the roller 13 is located rearward of the steps 9 and step frame 11 when the step frame 11 is in the operating position of FIG. 2. The roller 13 is configured to move the step frame 11 from the operating position to the stored position when the vehicle 5 is moving in a rearward direction R and contacts an upright surface such as the front wall of a loading dock 15.

The front wall of a loading dock 15 contacts the roller 13 and exerts a forward contact force CF on the roller 13 such that the step frame 11 pivots forward about the step pivot axis SPA because the roller 13 is above the step pivot axis SPA. The roller 13 rolls upward along the upright surface of the front wall of a loading dock 15 and the step frame 11 continues to pivot about the step pivot axis SPA from the operating position of FIG. 2 to the stored position of FIG. 3.

The step pivot axis SPA is located under the rear impact guard beam 7, and right and left front frame portions 17R, 17L of the step frame 11 extend downward in front of the rear impact guard beam 7 and are pivotally attached to the step pivot axis SPA, and the right and left front frame portions 17 R, 17L bear against a front face 7B of the rear impact guard beam 7 when the step frame 11 is in the operating position.

Right and left rear frame portions 19R, 19L of the step frame 11 extend rearward over the rear impact guard beam 7 and support the top and bottom steps 9, and the roller rotational axis RRA extends through bottom ends of the right and left rear frame portions 19R, 19L.

Figure 5:
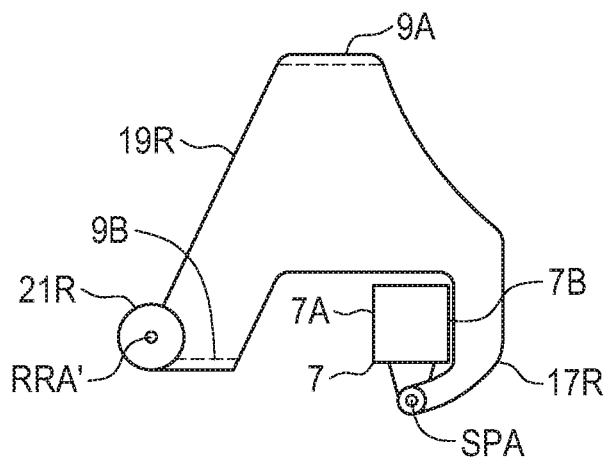
FIG. 5 is a schematic side view of an alternate embodiment of the step apparatus of the present disclosure in the operating position where the roller component is provided by right and left wheels.
Figure 6:
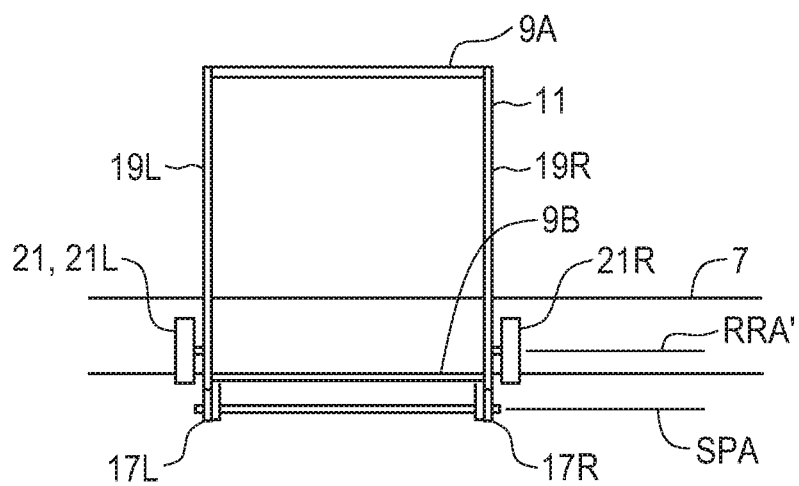
FIG. 6 is a schematic rear view of the embodiment of FIG. 5 in the operating position.

FIGS. 5 and 6 schematically illustrate an alternate configuration where the roller component is provided by right and left wheels 21R, 21L rotatably attached to right and left front frame portions 19R, 19L on right and left sides of the step frame 11 about a roller rotational axis RRA'. The wheels 21 have a larger diameter than the roller 13 and may provide improved operation on rough upright surfaces. The right and left wheels 21R, 21L are mounted on corresponding right and left outer sides of the step frame 11 and so leave an open area between the right and left rear frame portions 19R, 19L. The bottom step 9B may then be mounted lower as illustrated with the stepping surface of the bottom step 9B below the roller rotation axis RRA'.

The present disclosure provides a convenient step apparatus 1 for an elevated load bed 3 with reduced risk of damage. An operator can easily forget to move the apparatus 1 from the operating position to the stored position after use. The risk of damage is low while the vehicle is moving forward in the operating travel direction T however if the vehicle 3 reverses into a loading dock 1, the apparatus 1 will simply roll up the front wall of the loading dock 15 from the operating position to the stored position.

The forward contact force required to cause step frame 11 to pivot about the step pivot axis SPA and the roller components 13, 21 to roll upward along the upright surface can be reduced by adding weight to the front frame portions 17R, 17L of the step frame 11 forward of the step pivot axis SPA.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A step apparatus for an elevated load bed mounted on a vehicle, the vehicle comprising a rear impact guard beam mounted under a rear end of the load bed, the apparatus comprising:
   top and bottom steps mounted on a step frame;
   wherein the step frame is adapted to be pivotally attached to the rear impact guard beam about a step pivot axis oriented substantially horizontally and perpendicular to an operating travel direction of the vehicle;
   wherein the step frame is configured such that when pivotally attached to the rear impact guard beam, the step frame is movable from an operating position, where stepping surfaces of the steps are oriented substantially horizontally, to a stored position where the stepping surfaces of the steps are above and forward of a rear face of the rear impact guard beam;
   a roller component rotatably mounted to a bottom rear end of the step frame about a roller rotational axis oriented substantially parallel to the step pivot axis, and located above the step pivot axis, an outer surface of the roller component located rearward of the steps and step frame when the step frame is in the operating position;
   the roller component configured such that, when the step frame is in the operating position, an upright surface moving toward the step frame contacts the roller component and exerts a forward contact force on the roller component such that the roller component rolls upward along the upright surface and pivots the step frame about the step pivot axis from the operating position to the stored position.

2. The apparatus of claim 1 wherein the step pivot axis is under the rear impact guard beam.

3. The apparatus of claim 1 wherein when the step frame is pivotally attached to the rear impact guard beam, right and left front frame portions of the step frame extend downward in front of the rear impact guard beam and are pivotally attached at bottom portions thereof to the step pivot axis, and the right and left front frame portions bear against a front face of the rear impact guard beam when the step frame is in the operating position.

4. The apparatus of claim 3 wherein when the step frame is pivotally attached to the rear impact guard beam and the step frame is in the operating position, right and left rear frame portions of the step frame extend rearward over the rear impact guard beam and support the top and bottom steps, and the roller rotational axis extends through the right and left rear frame portions.

5. The apparatus of claim 1 wherein the roller component is provided by a cylindrical roller extending across the bottom rear end of the step frame.

6. The apparatus of claim 1 wherein the roller component is provided by right and left wheels rotatably attached to right and left sides of the step frame about the roller rotational axis.

7. The apparatus of claim 6 wherein the right and left wheels are mounted on corresponding right and left outer sides of the step frame.

8. The apparatus of claim 7 wherein, when the step frame is pivotally attached to the rear impact guard beam and the step frame is in the operating position, the stepping surface of the bottom step is below the roller rotation axis.

9. The apparatus of claim 1 comprising reducing the forward contact force required to cause the step frame to pivot about the step pivot axis and the roller component to roll upward along the upright surface by adding weight to a front portion of the step frame forward of the step pivot axis.

* * * * *